United States Patent
Craggs et al.

(10) Patent No.: US 10,572,216 B2
(45) Date of Patent: Feb. 25, 2020

(54) MOTIVATIONAL MUSIC ANALYZER

(71) Applicant: International Business Machines Corporation, Armonk, NY (US)

(72) Inventors: Daniel P. Craggs, Montreal (CA); Ian G. Craggs, Salisbury (GB)

(73) Assignee: International Business Machines Corporation, Armonk, NY (US)

( * ) Notice: Subject to any disclaimer, the term of this patent is extended or adjusted under 35 U.S.C. 154(b) by 185 days.

(21) Appl. No.: 15/086,794

(22) Filed: Mar. 31, 2016

(65) Prior Publication Data

US 2017/0286050 A1    Oct. 5, 2017

(51) Int. Cl.
| | |
|---|---|
| *G06F 17/00* | (2019.01) |
| *G06F 3/16* | (2006.01) |
| *G06F 16/638* | (2019.01) |
| *G06Q 50/00* | (2012.01) |
| *H04L 29/08* | (2006.01) |

(52) U.S. Cl.
CPC ............ *G06F 3/165* (2013.01); *G06F 16/639* (2019.01); *G06Q 50/01* (2013.01); *H04L 67/18* (2013.01); *H04L 67/22* (2013.01)

(58) Field of Classification Search
CPC ..... H04L 67/32; G06F 3/165; G06F 17/30772
See application file for complete search history.

(56) References Cited

U.S. PATENT DOCUMENTS

| | | | |
|---|---|---|---|
| 7,728,214 B2 | 6/2010 | Oliver et al. | |
| 8,898,170 B2 | 11/2014 | Haughay, Jr. et al. | |
| 9,123,317 B2 * | 9/2015 | Watterson | G10H 1/42 |
| 9,148,483 B1 * | 9/2015 | Molettiere | H04L 67/22 |
| 9,162,107 B2 | 10/2015 | Aminzade | |
| 2011/0016120 A1 * | 1/2011 | Haughay, Jr. | A63B 24/0062 707/734 |

OTHER PUBLICATIONS

"Run your way", Running—Spotify, <https://www.spotify.com/ca-en/running/>, printed Jan. 13, 2016, 1 page.

* cited by examiner

*Primary Examiner* — Fan S Tsang
*Assistant Examiner* — David Siegel
(74) *Attorney, Agent, or Firm* — Stephen R. Yoder; Gilbert Harmon, Jr.

(57) ABSTRACT

An approach for utilizing a motivational effect value for music on a computing device, the approach involves determining a performance indicator for a first segment of distance traveled, retrieving one or more performance factors associated with the first segment, calculating a first motivational effect value for one or more songs associated with the first segment, wherein the calculating is based on the performance indicator and the one or more performance factors, developing a playlist of music based on a plurality of motivational effect values, wherein the developing comprises at least one of generating a new playlist and modifying an existing playlist, and developing a playlist of suggested music based on receiving one or more motivational effect values associated with one or more groups of users.

20 Claims, 4 Drawing Sheets

MOTIVATIONAL MUSIC ANALYZER

BACKGROUND

The present invention relates generally to the field of mobile music applications, and more particularly to exercise music analysis.

Music applications for mobile computing devices, such as smart phones and tablet computers, are software programs that store a collection of a mobile device user's music for replay upon request. Music applications can connect to the internet to access music the mobile device user does not have stored on their device and to explore playlists of other music application users. Music applications on mobile devices are useful for runners, for example, who take their music with them while they exercise, which can have a beneficial influence on their performance.

Newly developed software programs for mobile computing devices can track the performance of a runner or someone else exercising and compare their performance against the music they are listening to while they workout. In this way, the music they are listening to can be analyzed for the effect it has on their performance. This can be useful for developing playlists that optimize the beneficial influence to performance that music can provide for one who is exercising.

SUMMARY

According to one embodiment of the present invention, a method for utilizing a motivational effect value for music on a computing device is provided, the method comprising determining a performance indicator for a first segment of distance traveled; retrieving one or more performance factors associated with the first segment; calculating a first motivational effect value for one or more songs associated with the first segment, wherein the calculating is based on the performance indicator and the one or more performance factors; developing a playlist of music based on a plurality of motivational effect values, wherein the developing comprises at least one of generating a new playlist and modifying an existing playlist; and developing a playlist of suggested music based on receiving one or more motivational effect values associated with one or more groups of users. A corresponding computer program product and computer system are also disclosed herein.

DETAILED DESCRIPTION

Embodiments of the present invention provide for optimizing the motivational effect that a playlist of music can have on a person who is exercising, such as, but not limited to, a runner. By analyzing the performance of a mobile device user who is listening to music (e.g., on a mobile music application) while exercising and comparing it against the music they are listening to, embodiments can determine an average motivational effect value (MEV) that individual songs, for example, have on the performance of the user, which can be used for developing playlists of music that are designed to enhance the performance of the user while exercising. A MEV can be generally defined as a measure of how beneficial a song is to a user's exercise performance. Further, embodiments of the present invention can take into account a variety performance factors, unrelated to any individual song, which can be used to adjust a MEV determined for a song during an instance of it being played during a workout. This adjusting can be useful for a more accurate determination of an average MEV for any particular song.

Additionally, embodiments of the present invention can make use of MEV data from other users, who can be categorized into a variety of groups. This MEV data from groups of other users can be used to refine playlists designed to enhance the exercise performance of a particular user and/or suggest new music or playlists which will likely also have a performance enhancing effect for the particular user. According to embodiments, a user has the option of selecting the types of groups of other users for MEV data that can be used in this way.

In describing embodiments in detail with reference to the figures, it should be noted that references in the specification to "an embodiment," "other embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, describing a particular feature, structure or characteristic in connection with an embodiment, one skilled in the art has the knowledge to affect such feature, structure or characteristic in connection with other embodiments whether or not explicitly described.

Figure 1:
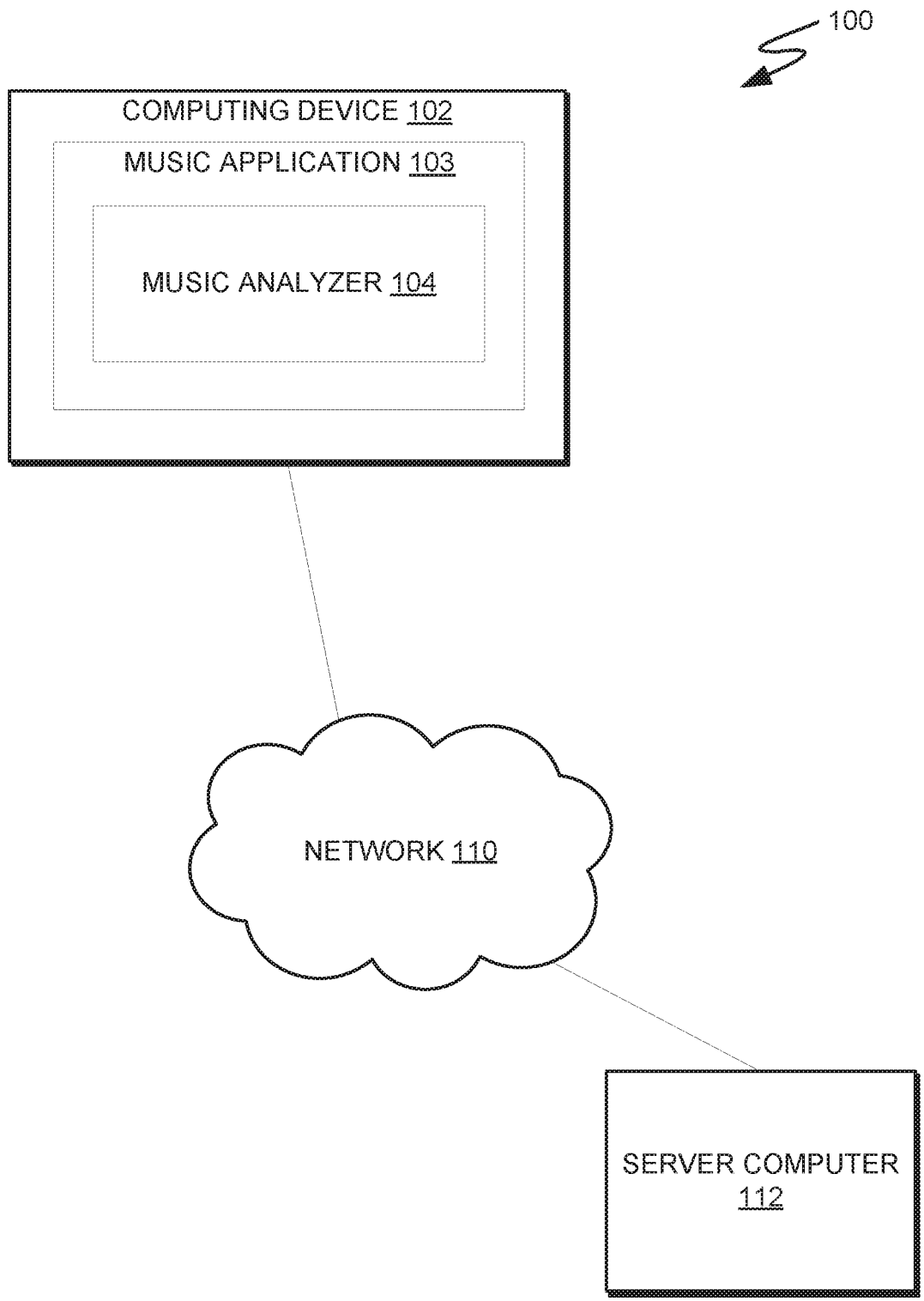
FIG. 1 is a functional block diagram illustrating a distributed data processing environment, in accordance with an embodiment of the present invention.

The present invention will now be described in detail with reference to the figures. FIG. 1 is a functional block diagram illustrating a distributed data processing environment 100, in accordance with one embodiment of the present invention. Distributed data processing environment 100 comprises computing device 102 and server computer 112, interconnected over network 110.

Although computing device 102 will be referred to herein primarily as a mobile device (e.g., a smart phone), computing device 102 can in general be a laptop computer, tablet computer, netbook computer, personal computer (PC), a desktop computer, a personal digital assistant (PDA), a smart phone, or any programmable electronic device capable of communicating with server computer 112 via network 110. Computing device 102 comprises music application 103, which can be configured, for example, to store and play a user's music and also connect to the internet to browse music and other users' playlists, e.g., Spotify, iTunes, etc. Music application 103 comprises music analyzer 104 which is a component configured to track the performance of a mobile device user and the songs listened to while exercising for determining average MEVs and developing playlists that enhance the performance of the mobile device user. Preferably, music analyzer 104 is implemented within music application 103 however, according to some embodiments, music analyzer 104 can be a separate application.

In various embodiments of the present invention, server computer 112 can be a laptop computer, tablet computer, netbook computer, personal computer (PC), a desktop computer, a personal digital assistant (PDA), a smart phone, or any programmable electronic device capable of communicating with computing device 102 via network 110. Server computer 112 can also be, for example, a computer system configured to handle requests made from music application 103 operating on a client device (e.g., computing device 102).

Network 110 can be, for example, a local area network (LAN), a wide area network (WAN) such as the Internet, or a combination of the two, and can include wired, wireless, or fiber optic connections. In general, network 110 can be any combination of connections and protocols that will support communications between computing device 102 and server computer 112. Computing device 102 may include internal and external hardware components, as depicted and described in further detail with respect to FIG. 4.

Figure 2:
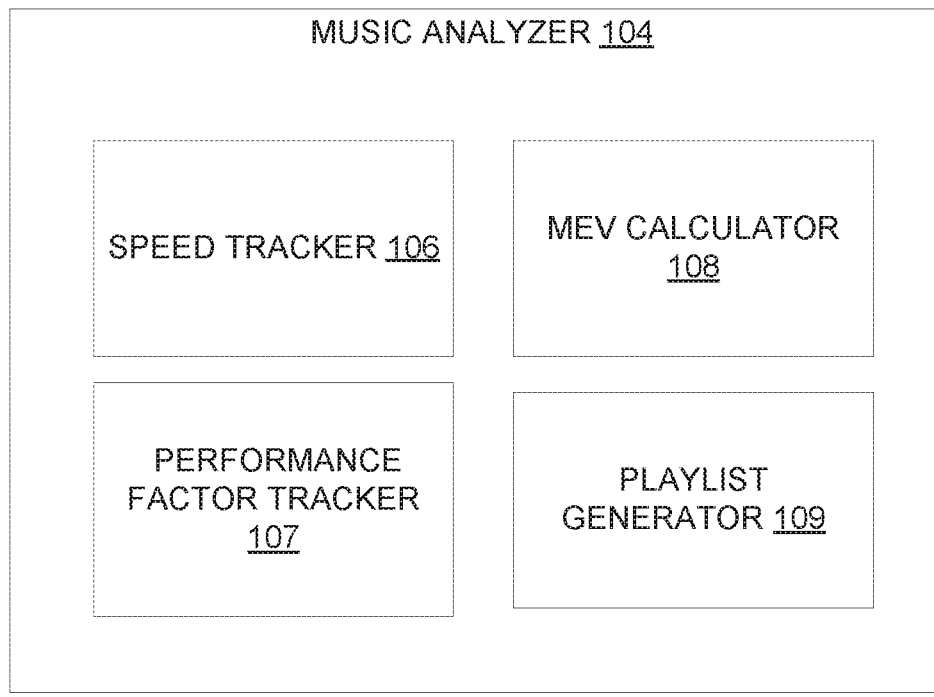
FIG. 2 is a functional block diagram depicting components of a music analyzer on a computing device within the data processing environment of FIG. 1, in accordance with an embodiment of the present invention.

FIG. 2 is a functional block diagram illustrating components of music analyzer 104, in accordance with an embodiment of the present invention. Music analyzer 104 comprises speed tracker 106, performance factor tracker 107, MEV calculator 108 and playlist generator 109. Speed tracker 106 can make use of features such as, but not limited to, GPS functionality associated with computing device 102 to track a performance indicator, e.g., an average speed of a user listening to music on computing device 102 while they run or bike, for segments of distance traveled.

Performance factor tracker 107 can access various sources of information for data associated with performance factors, wherein the performance factors are those that can affect average speeds tracked by speed tracker 106. Some examples of performance factors can be, but are not limited to, weather data (e.g., temperatures, precipitation, wind speeds, etc.), topographical data (e.g., elevation changes for a given segment) and health and exercise data for a user. These and other types of data can be accessed and retrieved by performance factor tracker 107 from other applications on computing device 102 (e.g., map applications, weather applications, health and/or fitness applications, etc.) and/or websites that may have such data, for example.

MEV calculator 108 can receive data from speed tracker 106 and performance factor tracker 107 to determine a MEV for each of one or more songs played during a segment of distance traveled. A MEV can be for example, but is not limited to, a value on a scale of 0 to 100, wherein a value of 0 can indicate that a song has no beneficial effect on exercise performance and higher values are associated with relatively higher beneficial effects, etc.

MEV calculator 108 can track one or more songs played during a segment of distance traveled and correlate the one or more songs with a performance indicator and performance factor data received, associated with the segment, to calculate MEVs for the one or more songs. MEV calculator 108 can store MEVs for any songs in music application 103 and these can be used to determine average MEVs for songs. Every time a new MEV is calculated for a song, for example, MEV calculator 108 can use the new MEV with stored MEVs associated with the song (i.e., MEVs recorded prior to the new MEV) to calculate an average MEV for the song.

Playlist generator 109 can receive stored MEVs, which can include average MEVs for songs, from MEV calculator 108 to develop playlists of music designed to enhance performance during a user's workout routine. Additionally, playlist generator 109 can access MEV data from groups of other users (e.g., available from server computer 112) to suggest new music that may enhance performance during a user's workout routine or modify existing playlists on their device.

Figure 3:
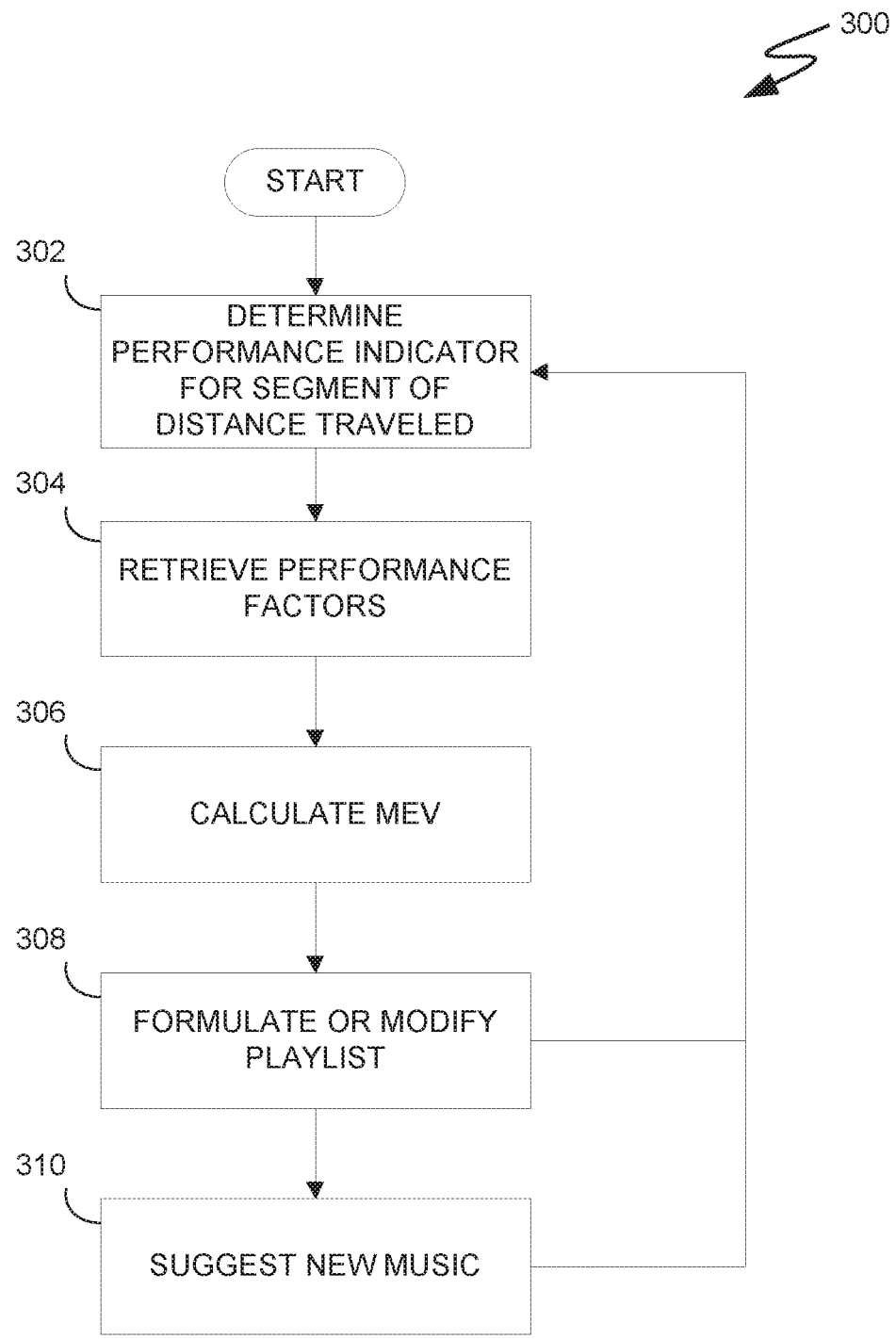
FIG. 3 is a flowchart depicting operational steps of the music analyzer, in accordance with an embodiment of the present invention.

Turning to FIG. 3, a flowchart 300 depicting operational steps of music analyzer 104 is provided, in accordance with an embodiment of the present invention. In a preferred embodiment, speed tracker 106 uses GPS functionality of computing device 102 to determine, at step 302, an average speed of a user for a segment of distance traveled, as a performance indicator for the segment. A segment of distance traveled can be based on, for example, a duration of time during which a song is played on music application 103 or other predetermined criteria, such as a segment comprising a geographical start point and end point. Considering an alternative to using GPS functionality, speed tracker 106 can use other means to determine a performance indicator of a user for a segment of distance traveled, e.g., speed tracker 106 uses data from a pedometer in another application on computing device 102 for a runner on a treadmill to determine an average speed, etc.

Performance factor tracker 107 retrieves, at step 304, performance factors associated with segments of distance traveled by a user carrying computing device 102. Tracked performance factor data can be accessed and retrieved from applications on computing device 102 and/or any websites which can be accessed via network 110 for example. Performance factor data retrieved can be based on preconfigured criteria, e.g., a user can optionally select what types of data are used for adjusting MEVs and from what sources the data are accessed and retrieved, etc.

MEV calculator 108, at step 306, receives data from speed tracker 106 and performance factor tracker 107 for calculating MEVs for songs played in music application 103 during segments of distance traveled. For a given segment, MEV calculator 108 can receive a performance indicator (e.g., an average speed) and performance factor data associated with the segment. As an example of how an initial MEV can be calculated for a song based on an average speed, in some embodiments MEV calculator 108 can divide an average speed measured for a given segment associated with the song by an average speed measured for a longer segment of distance traveled, e.g., an average speed measured for the entirety of a run, or divide the average speed for the given segment by previously measured average speeds under similar circumstances, e.g., time of day and/or weather conditions. The result of this division can be converted to an initial MEV by multiplying the result by an appropriate preconfigured factor, e.g., a result of 1.05 can be multiplied by a factor of 25 for an initial MEV of 26.25, etc.

Accounting for performance factors associated with a segment of distance traveled, one or more other multiplicative factors can in some embodiments be applied to an initial MEV (i.e., based on an average speed) for a song to determine an adjusted MEV. For example, measurable performance factors received (e.g., wind speed in MPH or elevation changes in degrees of incline, etc.) can be associated with proportional multiplicative factors that MEV calculator 108 can use to calculate an adjusted MEV. Additionally, performance factor data indicating that a user has already worked out prior to a run on a given day can be used to adjust MEVs calculated for songs played during the run, e.g., MEVs calculated can be appropriately raised to reflect that performance during the run may have been affected by the prior workout earlier in the day.

According to some embodiments, one or more songs played during a segment of distance traveled can have proportional average MEV changes based on performance during the segment. For example, when an average speed for the segment is divided by an average speed for a longer segment, the result can be converted to a percentage and applied proportionally to the average MEV of each song played during the segment, e.g., a result of 1.03 for the segment is converted to a +3% change which can be applied to three full songs played during the segment for an average MEV change of +1% for all three songs, etc.

Further, according to some embodiments, an adjusted MEV calculated for a first song can be further adjusted, retroactively, based on MEVs calculated for songs played after the first song. As an example, a first adjusted MEV for a first song can be calculated and then later recalculated to be a lower MEV than the first adjusted MEV because MEVs calculated for one or more songs played after the first song, e.g., songs associated with different segments than the first song, were lower than average. This may be an indication that a user has exhausted himself during a segment associated with the first song, thus affecting their performance during segments that followed and is therefore taken into account in the MEV of the first song. Conversely, the first adjusted MEV of the first song can be retroactively raised if MEVs calculated for one or more songs played after the first song were higher than average.

Playlist generator 109 generates new playlists or modifies existing playlists, at step 308, based on MEVs for songs received from MEV calculator 108. A user of computing device 102 can interact with a user interface (not shown) of music application 103 to configure settings associated with the development of playlists based on MEVs. For example, a user can request that a new playlist be generated by playlist generator 109 for music associated with a certain genre or artist, wherein songs selected for the playlist must have a minimum average MEV (e.g., 35, 40, etc.).

Playlist generator 109 can additionally or alternatively modify existing playlists on music application 103. For example, playlist generator 109 can be configured to remove songs with average MEVs below a threshold value from existing playlists, e.g., any songs with average MEVs below 35 are removed from a playlist, etc. Further, according to some embodiments, music played randomly on a shuffle mode of music application 103 can be based on average MEVs according to predetermined criteria, e.g., all songs having at least a minimum threshold average MEV are shuffled, etc.

Playlist generator 109 suggests, at step 310, new music based on average MEVs of songs from groups of other users. MEV calculator 108 can send MEVs (including average MEVs) calculated for songs in music application 103 to server computer 112, which can comprise a database of MEVs of songs for individual users of music analyzer 104. Individual users of music analyzer 104 having MEVs in the database can be categorized into groups according to similar demographics such as, but not limited to, location, social media networks, musical tastes, age, gender, exercise speeds, sports and activities. An average MEV for a song can be calculated for a particular group of users based on an averaging of the MEVs that any of the users in the group have sent to the database for that song, wherein those MEVs sent to the database can be received by MEV calculator 108 for averaging. It should be noted that MEVs in the database can be standardized in order for MEVs to be comparable from user to user.

A user of music application 103 on computing device 102 can specify which groups of other users, which can be associated with similar demographics of the user, are used for the suggestion of new music by playlist generator 109. Specified groups can in some embodiments comprise more than one similar demographic, e.g., a group of users within a certain distance of geographical location who all have similar musical tastes and exercise speeds, etc. Playlist generator 109 can receive, from server computer 112, average MEVs for songs from a group of other users and use those received MEVs to make music suggestions. Based on average MEVs received from a group of other users, playlist generator 109 can, for example, generate new playlists of suggested music, play suggested music at random and/or modify existing playlists on music application 103, according to predetermined criteria. As an example, playlist generator 109 can edit existing playlists by removing songs having average MEVs, from a group of other users, below a threshold MEV, or add songs (i.e., suggested music) to the playlist having average MEVs from the group above another threshold MEV, etc.

It should be noted that over time, it may be found that music suggestions based on certain groups of users are more effective than music suggestions based on other groups. For example, music analyzer 104 can compare the efficacy of musical suggestions based on groups of users according to MEVs calculated for those songs suggested to a user of computing device 102. Data associated with certain groups of users which result in the highest calculated MEVs for musical suggestions based on those groups can be sent to server computer 112 which can use that data for determining default groups of users (for musical suggestions) for new users of music analyzer 104.

Figure 4:
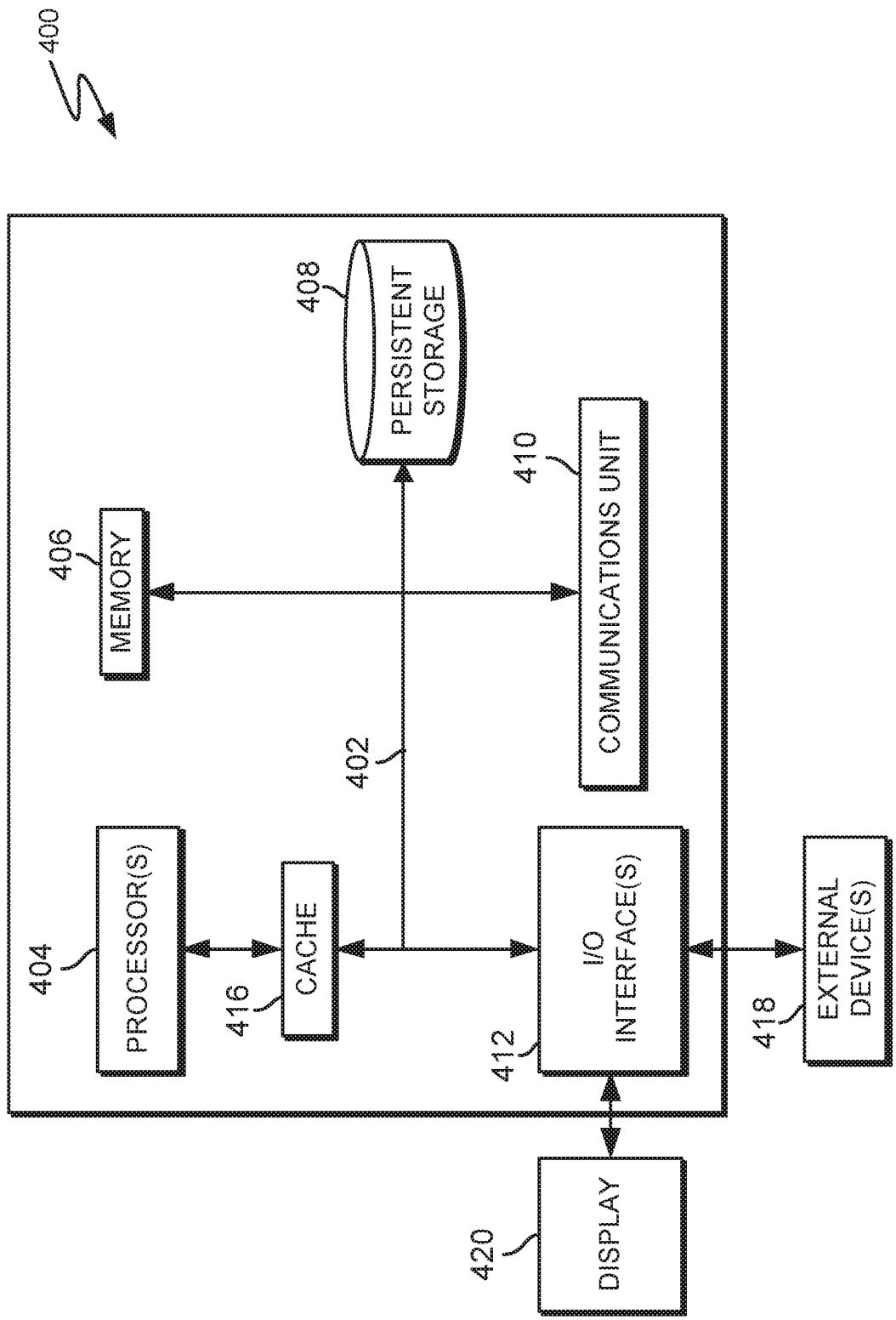
FIG. 4 is a block diagram of components of the computing device executing the music analyzer, in accordance with an embodiment of the present invention.

FIG. 4 depicts a block diagram of components of computing device 102 in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

Computing device 102 includes communications fabric 402, which provides communications between cache 416, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses or a crossbar switch.

Memory 406 and persistent storage 408 are computer readable storage media. In this embodiment, memory 406 includes random access memory (RAM). In general, memory 406 can include any suitable volatile or non-volatile computer readable storage media. Cache 416 is a fast memory that enhances the performance of computer processor(s) 404 by holding recently accessed data, and data near accessed data, from memory 406.

Music analyzer 104 can be stored in persistent storage 408 and in memory 406 for execution by one or more of the respective computer processors 404 via cache 416. In an embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 408 can also be removable. For example, a removable hard drive can be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices. In these examples, communications unit 410 includes one or more network interface cards. Communications unit 410 can provide communications through the use of either or both physical and wireless communications links. Music analyzer 104 can be downloaded to persistent storage 408 through communications unit 410.

I/O interface(s) 412 allows for input and output of data with other devices that can be connected to computing device 102. For example, I/O interface 412 can provide a connection to external devices 418 such as a keyboard, keypad, a touch screen, and/or some other suitable input device. External devices 418 can also include portable computer readable storage media such as, for example, thumb drives, portable optical or magnetic disks, and memory cards. Software and data used to practice embodiments of the present invention, e.g., music analyzer 104, can be stored on such portable computer readable storage media and can be loaded onto persistent storage 408 via I/O interface(s) 412. I/O interface(s) 412 also connect to a display 420.

Display 420 provides a mechanism to display data to a user and can be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention can be a system, a method, and/or a computer program product at any possible technical detail level of integration. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for utilizing a motivational effect value for music on a computing device, the method comprising:
   determining a performance indicator for a first segment of distance traveled by a user based on determining an average speed by a global positioning system (GPS) device;
   retrieving one or more performance factors associated with the first segment and comprising weather data and topographical data;
   identifying a previously completed workout corresponding to the user;
   calculating one or more weighted performance factors by altering one or more values corresponding to the one or more performance factors according to a set of configurable proportional multiplicative factors;
   calculating a first motivational effect value for one or more songs associated with the first segment, wherein the calculating is based on the performance indicator and the one or more weighted performance factors;
   adjusting the first motivational effect value based on the previously completed workout;
   developing a playlist of the one or more songs based on a plurality of motivational effect values, including the first motivational effect value, wherein the developing comprises at least one of generating a new playlist and modifying an existing playlist;
   developing a playlist of suggested music based on receiving, from a server communicatively connected by a network, one or more motivational effect values associated with one or more groups of users, including the first motivational effect value; and
   outputting the playlist of suggested music for playing.

2. The method of claim 1, wherein the performance indicator is an average speed.

3. The method of claim 1, wherein the first segment is determined based on at least one of a duration of a song of the one or more songs and a segment comprising a geographical start point and a geographical end point.

4. The method of claim 1, wherein the one or more performance factors further comprise at least one of health data and exercise data.

5. The method of claim 4, wherein the exercise data comprises one or more workouts performed prior to the calculating of the first motivational effect value, wherein the one or more workouts were performed on a same day as the calculating.

6. The method of claim 1, wherein the one or more groups of users are associated with demographic information comprising at least one of location, social media networks, musical tastes, age, gender, exercise speeds, sports, and activities.

7. The method of claim 1, wherein the first motivational effect value calculated for the one or more songs associated with the first segment is adjusted based on motivational effect values calculated for songs associated with one or more segments of distance traveled after the first segment.

8. A computer program product for utilizing a motivational effect value for music on a computing device, the computer program product comprising:
   one or more computer readable storage media and program instructions stored on the one or more computer readable storage media, the program instructions comprising:
   program instructions to determine a performance indicator for a first segment of distance traveled based on determining an average speed by a global positioning system (GPS) device;
   program instructions to retrieve one or more performance factors associated with the first segment and comprising weather data and topographical data;
   program instructions to calculate one or more weighted performance factors by altering one or more values corresponding to the one or more performance factors according to a set of configurable proportional multiplicative factors;
   program instructions to calculate a first motivational effect value for one or more songs associated with the first segment, wherein the calculating is based on the performance indicator and the one or more weighted performance factors;
   program instructions to develop a playlist of the one or more songs based on a plurality of motivational effect values, including the first motivational effect value, wherein the developing comprises at least one of generating a new playlist and modifying an existing playlist;

program instructions to develop a playlist of suggested music based on receiving, from a server communicatively connected by a network, one or more motivational effect values associated with one or more groups of users, including the first motivational effect value; and program instructions to output the playlist of suggested music for playing.

9. The computer program product of claim 8, wherein the performance indicator is an average speed.

10. The computer program product of claim 8, wherein the first segment is determined based on at least one of a duration of a song of the one or more songs and a segment comprising a geographical start point and a geographical end point.

11. The computer program product of claim 8, wherein the one or more performance factors further comprise at least one of health data and exercise data.

12. The computer program product of claim 11, wherein the exercise data comprises one or more workouts performed prior to the calculating of the first motivational effect value, wherein the one or more workouts were performed on a same day as the calculating.

13. The computer program product of claim 8, wherein the one or more groups of users are associated with demographic information comprising at least one of location, social media networks, musical tastes, age, gender, exercise speeds, sports, and activities.

14. The computer program product of claim 8, wherein the first motivational effect value calculated for the one or more songs associated with the first segment is adjusted based on motivational effect values calculated for songs associated with one or more segments of distance traveled after the first segment.

15. A computer system for utilizing a motivational effect value for music on a computing device, the computer system comprising:

one or more computer processors;

one or more computer readable storage media;

program instructions stored on the one or more computer readable storage media for execution by at least one of the one or more processors, the program instructions comprising:

program instructions to determine a performance indicator for a first segment of distance traveled based on determining an average speed by a global positioning system (GPS) device;

program instructions to retrieve one or more performance factors associated with the first segment and comprising weather data and topographical data;

program instructions to calculate one or more weighted performance factors by altering one or more values corresponding to the one or more performance factors according to a set of configurable proportional multiplicative factors to provide weighted performance factors;

program instructions to calculate a first motivational effect value for one or more songs associated with the first segment, wherein the calculating is based on the performance indicator and the one or more weighted performance factors;

program instructions to develop a playlist of the one or more songs based on a plurality of motivational effect values, including the first motivational effect value, wherein the developing comprises at least one of generating a new playlist and modifying an existing playlist;

program instructions to develop a playlist of suggested music based on receiving, from a server communicatively connected by a network, one or more motivational effect values associated with one or more groups of users, including the first motivational effect value; and program instructions to output the playlist of suggested music for playing.

16. The computer system of claim 15, wherein the performance indicator is an average speed.

17. The computer system of claim 15, wherein the one or more performance factors further comprise at least one of health data and exercise data.

18. The computer system of claim 17, wherein the exercise data comprises one or more workouts performed prior to the calculating of the first motivational effect value, wherein the one or more workouts were performed on a same day as the calculating.

19. The computer system of claim 15, wherein the one or more groups of users are associated with demographic information comprising at least one of location, social media networks, musical tastes, age, gender, exercise speeds, sports, and activities.

20. The computer system of claim 15, wherein the first motivational effect value calculated for the one or more songs associated with the first segment is adjusted based on motivational effect values calculated for songs associated with one or more segments of distance traveled after the first segment.

* * * * *